May 5, 1925.
L. McKEE ET AL
AUTOMOBILE WHEEL
Filed March 31, 1924
1,536,232
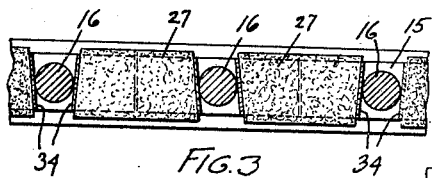
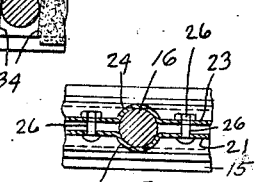
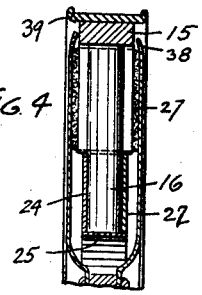
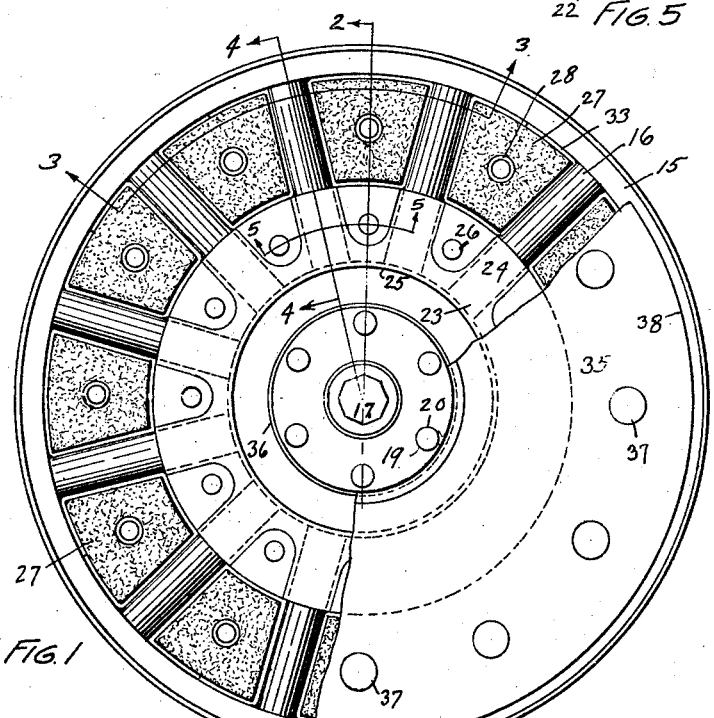
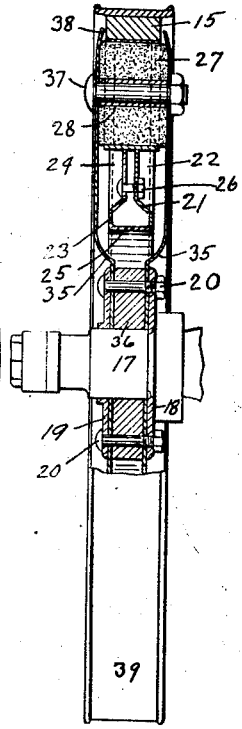
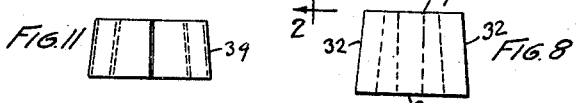
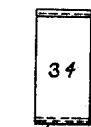
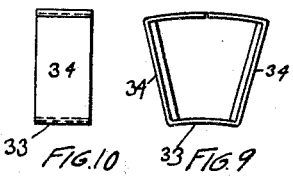
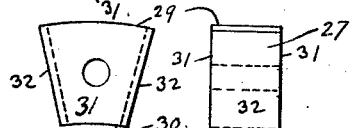
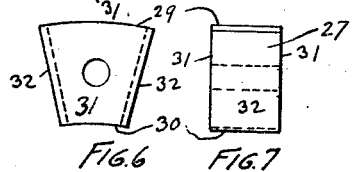
INVENTORS
L. McKEE
C. A. ROACH
By C. B. Birkenbeul
ATTORNEY Patented May 5, 1925.

1,536,232

UNITED STATES PATENT OFFICE.

LINDSAY McKEE AND CHARLES A. ROACH, OF PORTLAND, OREGON.

AUTOMOBILE WHEEL.

Application filed March 31, 1924. Serial No. 703,044.

*To all whom it may concern:*

Be it hereby known that I, LINDSAY MCKEE and CHARLES A. ROACH, citizens of the United States, and residents of Portland, in the county of Multnomah and State of Oregon, have invented a new and useful Attachment for Automobile Wheels, of which the following is a specification.

This invention relates more particularly to automobile wheels.

An object of our invention is to provide an exceedingly simple, efficient and inexpensive device for converting an artillery type of automobile wheel into a resilient wheel on which either solid or pneumatic tires can be used, although its main object is to dispense with the pneumatic tire itself.

A second object is to so construct the device that the existing artillery wheels may be employed and the device itself become an attachment or part of same.

A third object is to so construct our invention that it can be installed by even an inexperienced person with the aid of only a key-hole saw and a wrench.

A fourth object is to divide the entire load among all of the spokes at all times and to support the load on the maximum amount of rubber.

These and other objects will become more readily understood from the specification following and as illustrated in the accompanying drawing, in which:—

Figure 1 is a side elevation of an artillery wheel equipped with our device and with a portion of the side disks cut away. Figure 2 is a section taken along the line 2—2 in Figure 1. Figure 3 is a section taken along the line 3—3 in Figure 1. Figure 4 is a section taken along the line 4—4 in Fig. 1. Figure 5 is a section taken along the line 5—5 in Figure 1. Figure 6 is a side elevation of a rubber block such as is used in the device with its bushing removed. Figure 7 is an end elevation of the block shown in Figure 6 and Figure 8 is a plan of the same. Figure 9 is a side elevation of a block casing without a rubber block. Figure 10 is a front elevation of the casing shown in Figure 9 and Figure 11 is a plan of the same.

Similar numbers of reference refer to the same parts throughout the several views.

Referring in detail to the drawing, we have illustrated the ordinary artillery wheel having a felloe 15 and spokes 16, and having a hub 17 with an inner flange 18 and an outer or detachable flange 19. These flanges are ordinarily held together by the bolts 20.

Our device requires the elimination or cutting away on the central portion of the spokes 16 and the formation of a relatively large central opening in the wheel. The spoke ends are held in their proper angular relation during the cutting operation by a disk 21 which is used as a pattern for cutting out the central opening with a keyhole saw. The outer portion of the disk 21 is provided with curved portions 22 to receive a portion of each of the spokes 16. After the central opening is formed in the wheel a second disk 23 is placed on the opposite side of the wheel and its curved portions 24 engage the spokes 16, as do the portions 22. The central opening on the disk 23 is provided with an inturned flange 25 which lines the wheel opening and forms a support for all of the spoke ends, and it extends to the outside of the disk 21. Bolts 26 secure the disks 21 and 23 together.

Between the spokes 16, the felloe 15 and the disks 21 and 23 we have placed the rubber blocks 27 which are somewhat wider than the felloe 15. Each block 27 is provided with a bushing 28 whose length is midway between the width of the felloe 15 and the blocks 27.

The blocks 27 are preferably curved on their outer and inner faces 29 and 30 and the lateral faces 31 are parallel, while the faces 32 converge and the blocks themselves are inserted in similarly shaped but narrower casings 33 whose converging faces 34 engage the sides of the spokes 16. The blocks 27 with their casings 33 are placed between the spokes 16 alternately from opposite sides.

The side disks 35 are bolted between the flanges 18 and 19 on each side of the fiber spacer 36 by the bolts 20. Concentric bolts 37 pass through both disks 35 and through the bushings 28 and hold the disks against the bushings 28 and at the same time compress the rubber in the blocks 27. The curved disk edges 38 are held away from the sides of the felloe 15, owing to the fact that the blocks 27 are wedge-shaped and inserted between the spokes from opposite sides, as above described. Ordinarily a solid rubber tire (not shown) is placed on the rim 39.

The application of our device to a wheel is as follows: The hub is first removed from the wheel by taking out the bolts 20 and the disk 21 is set in place against the spokes 16. The disk 21 now serves as a pattern or templet and, with the aid of a keyhole saw, the spokes are cut out to correspond with the central opening in the disk 21. After this is done the opposite disk 23 is put into place and the bolts 26 inserted and tightened. The rubber blocks 27, with their casings 33, are now inserted between the spokes 16 and the side disk 35, with the included spacer 36, are now put in place and securely joined together by the bolts 20 and 37.

We are aware that many forms of resilient wheels have been constructed in the past, but we have directed our efforts toward the production of an attachment which will enable the possessor of an artillery wheel to convert same into a resilient wheel with a very small expenditure of money and effort, and with the employment of only ordinary skill and tools. We therefore do not claim resilient wheels broadly, but we do intend to cover such forms and modifications as fall fairly within the appended claims.

We claim:

1. An artillery wheel having the inner ends of its spokes cut away outside of the diameter of the hub flanges in combination with a spoke-holding ring separated from the hub of said wheel; a plurality of rubber blocks filling the opening between said spokes; a pair of disks on opposite sides of said wheel; and means for attaching said disks to said rubber blocks and to the wheel hub.

2. An artillery wheel having the inner ends of its spokes cut away outside of the diameter of the hub flanges, in combination with a spoke spacing disk placed against one side of said wheel; a similar disk placed against the opposite side of said wheel, one of said disks having an inturned flange touching the spoke ends; a plurality of rubber blocks placed in the openings between said spokes; a pair of disks secured to the hub of said wheel; and means for attaching said rubber blocks to said disks.

3. An automobile wheel consisting of a felloe having spokes mounted therein; ring means for uniting the inner ends of said spokes; rubber blocks filling the spaces between said spokes; a casing around each of said blocks touching said spokes, said casing having lateral taper; a hub separated from said spoke uniting ring; and disks on said hub clamped against said rubber blocks.

4. An automobile wheel having a large central opening formed by cutting off the inner ends of its spokes; a ring around said opening supporting the ends of said spokes; a hub passing through said opening and separated from the sides thereof; a pair of disks attached to said hub and clearing the sides of the wheel felloe; a plurality of rubber blocks placed in the openings between said spokes, each of said blocks having a bushing placed therein; and bolts in said bushings clamping said disks against said bushings and compressing said rubber blocks.

5. An automobile wheel having its hub separated from its spokes, in combination with a plurality of tapered rubber blocks placed between said spokes from opposite sides in alternate openings, each of said blocks having a spoke-touching casing formed around same in a manner that said rubber blocks can project from both sides thereof; a bushing in each block somewhat shorter than the width of a block before it is compressed; a disk on each side of said wheel secured to said hub; and bolts through said blocks holding said disks against said bushings and compressing said blocks.

LINDSAY McKEE.
CHARLES A. ROACH.